United States Patent [19]

Tanizawa et al.

[11] Patent Number: 5,333,982
[45] Date of Patent: Aug. 2, 1994

[54] LOAD TRANSPORT SYSTEM FOR AUTOMATED WAREHOUSING

[75] Inventors: Hideichi Tanizawa, Moriguchi; Shuzo Nishino, Kawanishi; Takashi Okamura, Osaka, all of Japan

[73] Assignee: Daifuku Co., Ltd., Osaka, Japan

[21] Appl. No.: 885,264

[22] Filed: May 18, 1992

[30] Foreign Application Priority Data

May 22, 1991 [JP] Japan .................. 3-148017
May 22, 1991 [JP] Japan .................. 3-148018
May 22, 1991 [JP] Japan .................. 3-148021

[51] Int. Cl.⁵ ............................. B65G 1/04
[52] U.S. Cl. ..................... 414/279; 191/29 R; 414/280
[58] Field of Search ......... 414/267, 273, 277, 279, 414/280; 191/29 R, 29 DM; 104/290

[56] References Cited

U.S. PATENT DOCUMENTS

| | | | |
|---|---|---|---|
| 3,402,836 | 9/1968 | Debrey et al. | 414/273 |
| 3,417,879 | 12/1968 | Gough | 414/279 X |
| 3,554,390 | 1/1971 | Saul | 414/277 X |
| 3,709,383 | 1/1973 | Jennings et al. | 104/290 X |
| 4,252,217 | 2/1981 | Benjamin | 414/279 X |
| 4,478,673 | 10/1984 | Plocher | 414/277 X |
| 4,817,533 | 4/1989 | Azukizawa et al. | 104/290 X |
| 4,970,962 | 11/1990 | Burg et al. | 191/29 R X |
| 4,975,012 | 12/1990 | Motoda | 414/279 |
| 5,002,449 | 3/1991 | Kita et al. | 414/279 |

Primary Examiner—David A. Bucci
Attorney, Agent, or Firm—Schweitzer Cornman & Gross

[57] ABSTRACT

A cargo transport system for automated warehousing, wherein there are guide rail structures each mounted from an opposing shelving face structure of two rows of storage shelves extending substantially parallel to each other and present opposing shelving face structures toward one another, each of the guide rail structures including a guide rail with sides, at least one or more power supply conductors, or control signal conductors, or both power supply conductors and control signal conductors disposed substantially parallel to each other and arranged along the side of at least one guide rail, a cargo carrier adapted to roll over the guide rails, and collector attached from the load carrier for maintaining substantially constant electrically conducting contact with the power supply conductors and the control signals conductors for respectively powering and controlling the movement of the cargo carrier.

9 Claims, 7 Drawing Sheets

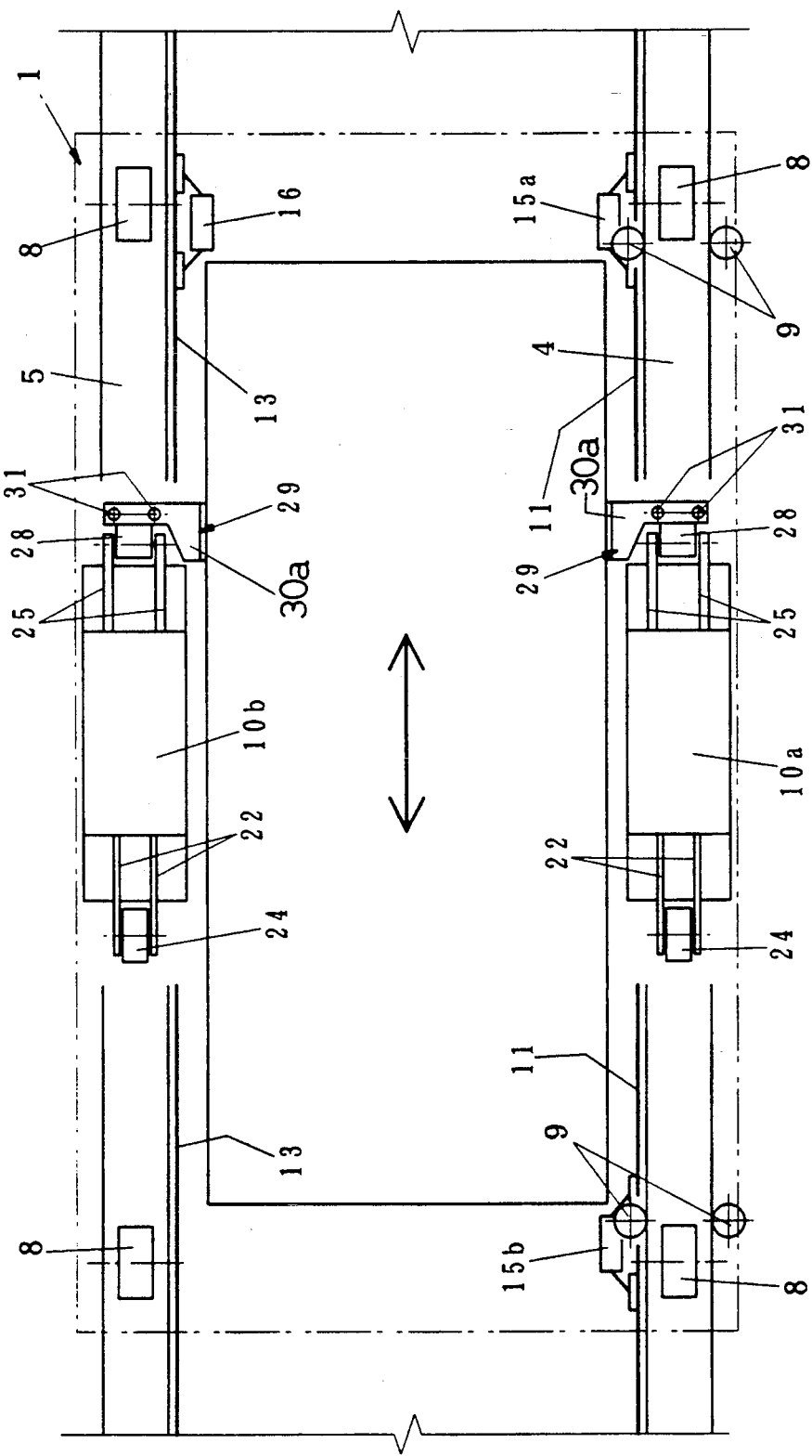

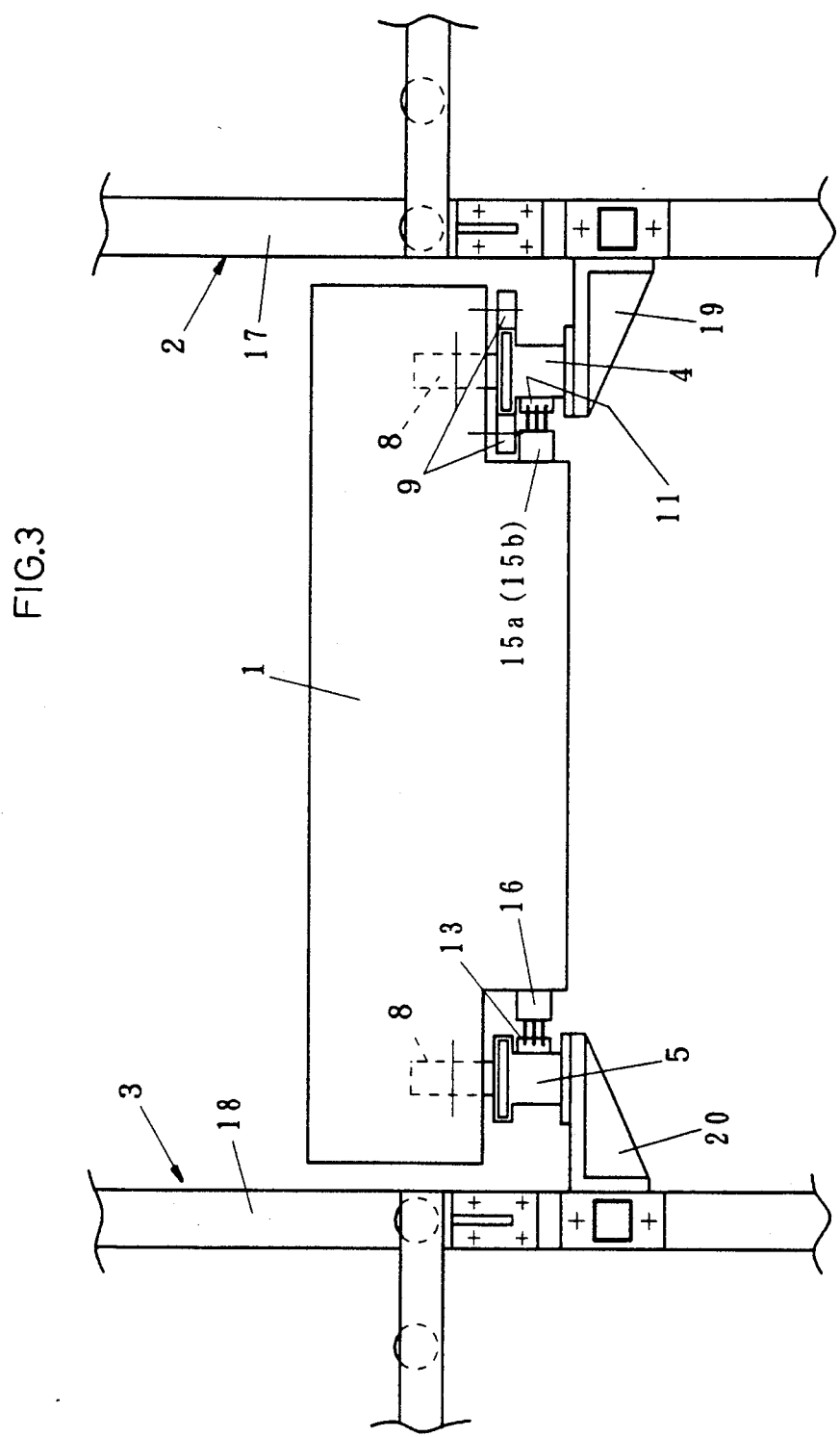

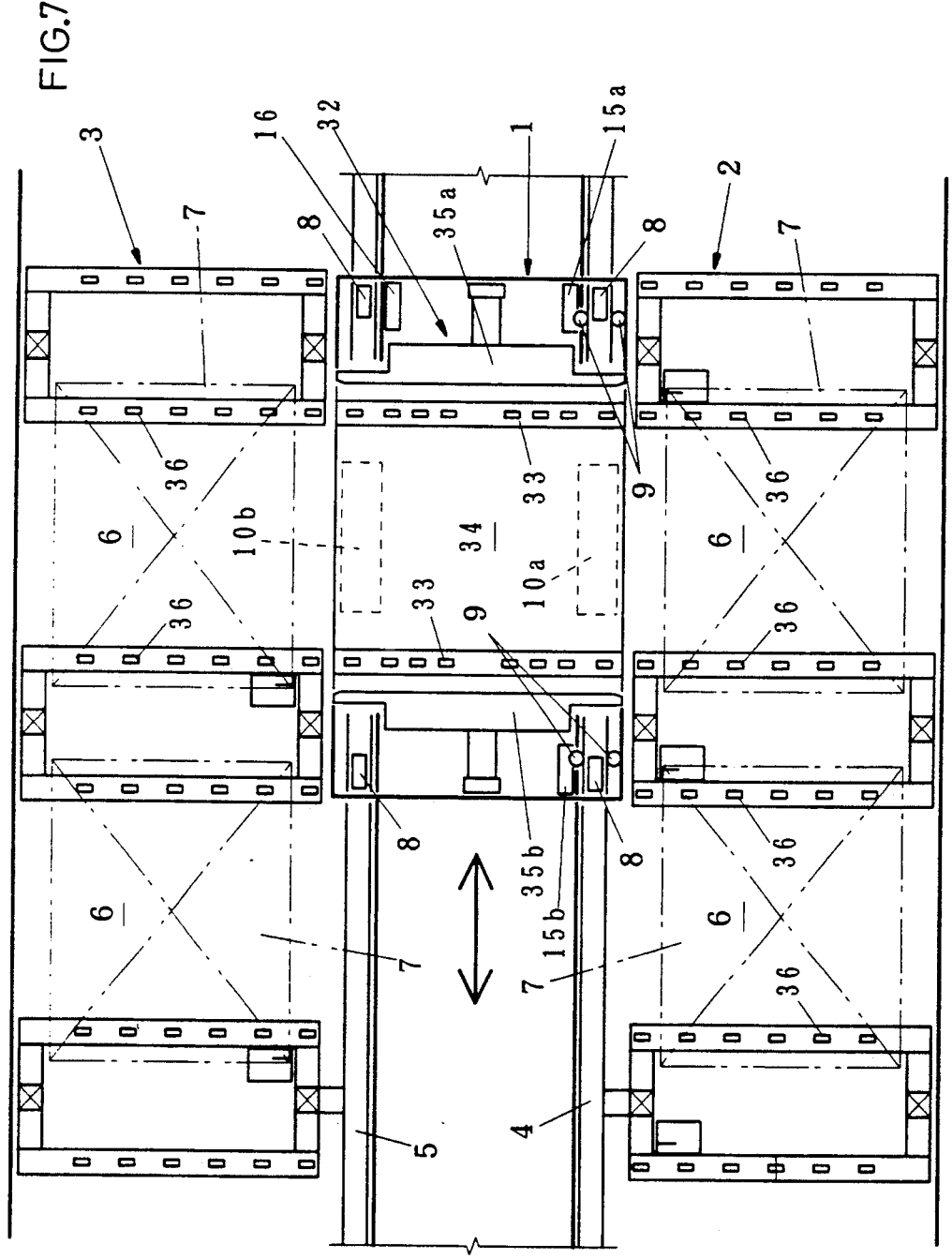

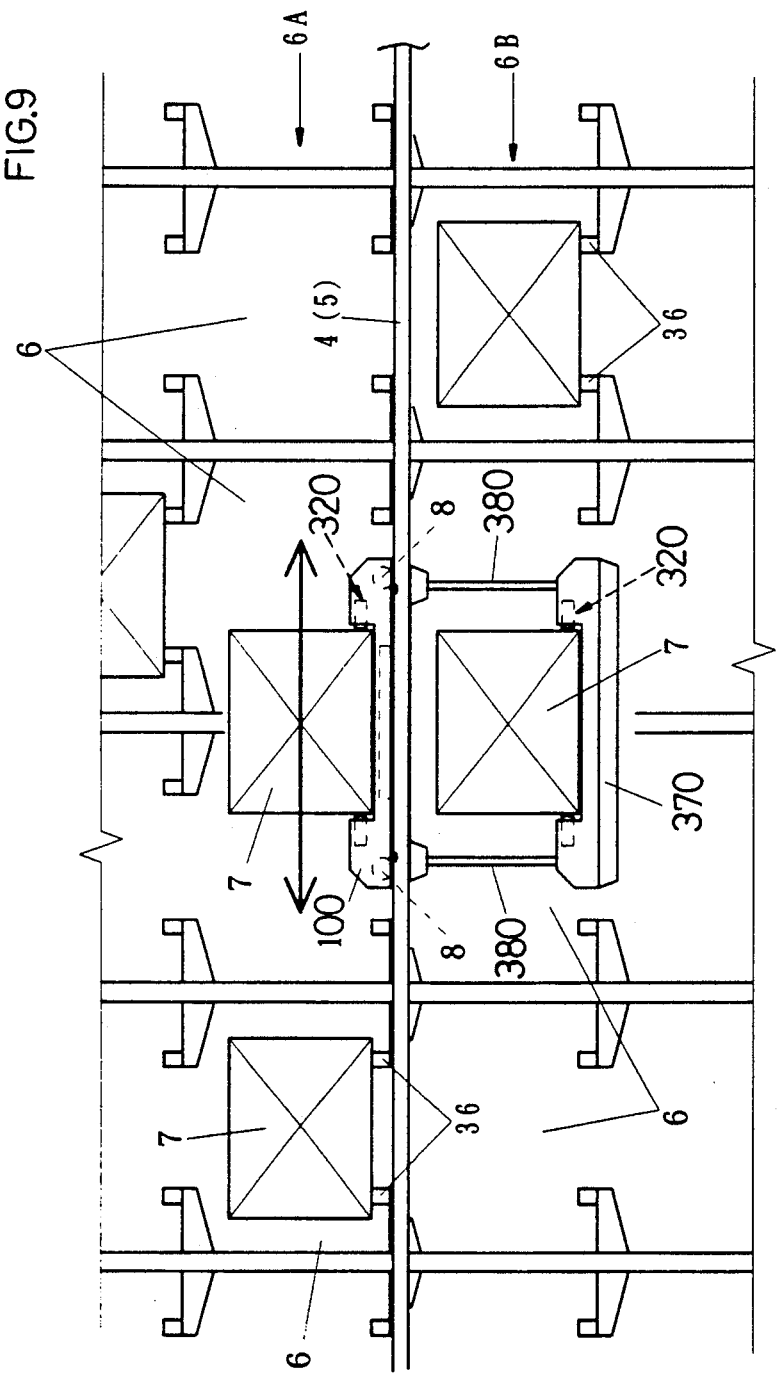

LOAD TRANSPORT SYSTEM FOR AUTOMATED WAREHOUSING

FIELD OF THE INVENTION

The present invention relates to a load transport system for automated warehousing, in which a plurality of electrically driven cargo carriers run on multilevel routes disposed one over another between two rows of opposing assemblies of cargo storage shelves.

BACKGROUND OF THE INVENTION

Conventionally, in warehousing load transport systems, a plurality of running routes are provided for the electrically driven cargo carriers in relation to load storage sections of the shelves at each level. Therefore, the cargo storage efficiency of shelves becomes low if the vertical distances between the upper and lower running routes at different levels are too big compared to the height of the load to be handled. On the other hand, the carrier running route at each level requires a number of power supply wires and control signal transmission wires for operating the electrically driven cargo carriers. When floor plates are provided between two opposing assemblies of shelves at each level story for such carrier running routes, the power supply wires and control signal transmission wires can be laid horizontally on the floor plates, parallel with each other. However, when floor plates are not provided between two opposing assemblies of shelves at each level, the power supply wires and control signal transmission wires have to be laid one over the other in parallel at each level on the sides of the carrier running routes.

Accordingly, it is an object of the invention to enhance the cargo storage efficiency of shelves by economizing the vertical space required for power supply wires and control signal transmission wires disposed one over another in parallel to reduce the vertical intervals between the carrier running routes at two levels by as much as possible.

In addition, in the cargo transport system of the prior art in which running routes for the cargo carriers are provided at each storage shelf level, if the cargo carrier is relatively high, such as may be necessitated by its drive system, the vertical space required for the running carrier takes up a substantial portion of the total height of the facility, such as that of the shelves. This means that a load storage efficiency of the shelves becomes low, and makes the overall cost of the warehousing facilities expensive.

Accordingly, another object of the present invention is to sharply reduce the number of cargo carriers in relation to the number of levels of shelves for load storage.

SUMMARY OF THE INVENTION

The present invention provides a cargo transport system for automated warehousing in which running routes for a plurality of electrically driven cargo carriers are provided at multiple levels between two rows of opposing assemblies of cargo storage shelves and a pair of guide rails are arranged at each running route for guiding the cargo carriers. The system comprises a plurality of power supply wires and control signal transmission wires laid one over another and parallel to each other, on the guide rails internally at opposing sides of the running route and farther from the opposing assemblies of shelves, separately and respectively; and the load carrier being provided on both the lateral sides thereof with collector units slidable on the power supply wires and the control signal wires laid on the internal lateral sides of the guide rails.

A plurality of power supply wires and control signal transmission wires are laid on the right and left guide rails at opposing internal lateral sides separately and respectively in the load transport system for automated warehousing of the present invention, so that it is possible to make short to about a half degree the height of the carrier guide rails, on their internal lateral side of which the wires are laid one above another in parallel for supplying power and transmitting control signal to the load carriers on the running routes, even if the number of wires are numerous, in comparison with the case in which all the power supply wires and control signal transmission wires are laid on one of the right and left guide rails at the internal lateral side.

Therefore, it becomes possible to make short the vertical intervals between the carrier running routes at two stories by the dimension reduced in height of the guide rails. Especially in the case of a large scaled automated warehousing having a large number of running routes, it is possible to enhance the load storage efficiency of shelves and an economic effect to a great extent.

With the second object in view, the present invention provides a load transport system for automated warehousing wherein the running routes for the load carriers are placed at alternate stores for alternate load storage shelves of the opposing assemblies, and the load carriers are equipped with a load transferring means for the corresponding alternate load storage shelves and with another load transferring means, suspended from the load carriers with suspender struts, for the remaining load storage shelves.

The load transport system for automated warehousing of the present invention is arranged to enable one load carrier to take charge of two stories of upper and lower load storage shelves, so that it is possible to reduce by half the number of load carriers in comparison with the provision of load carriers for every story of load storage shelves. Therefore, the number reducibility of the load carriers, which need the arrangement of the power supply wires and control signal transmission wires and the collector units, enables the realization of low cost. Furthermore, when the load transferring means suspended from the load carrier does not occupy a great deal of vertical space, the vertical space necessary for the running carriers in the whole facilities can be economized so as to enhance the load storage efficiency of shelves.

Other objects, features, and advantage of the invention will be apparent from the following detailed description.

BRIEF DESCRIPTION OF THE DRAWING

The present invention is described in greater detail with reference being had to the drawing wherein:

FIG. 2 is a schematic plan view of an electrically driven cargo carrier;

FIG. 3 is an enlarged front elevational view showing details of cargo transport system of FIG. 1;

FIG. 7 is a plan elevational view showing a cargo transfer apparatus;

FIG. 9 is a side elevational view of the cargo transport system, in which one of the opposing assemblies of shelves is omitted.

DETAILED DESCRIPTION OF EMBODIMENTS OF THE INVENTION

Figure 1:
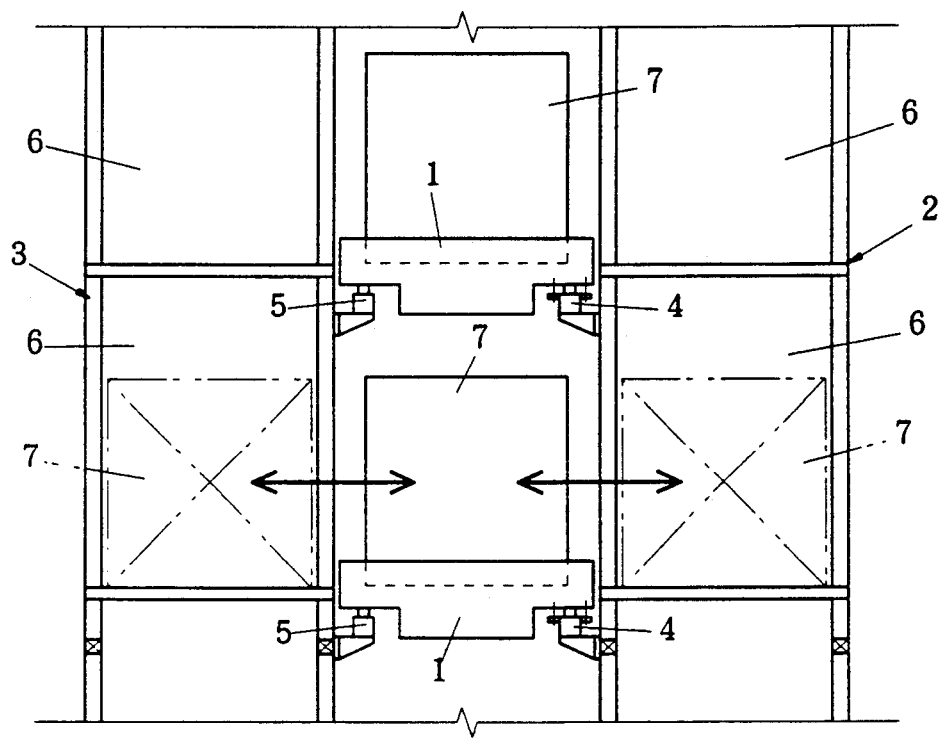
FIG. 1 is a front elevational view of a cargo transport system for automated warehousing of a first embodiment of the present invention.

As shown in the embodiment of the cargo transport system for automated warehousing of the present invention illustrated in FIGS. 1-7, an electrically driven cargo carrier 1 is driven by linear motors and is used for transferring cargo to and from a predetermined storage position. For each level of cargo storage spaces 6 of two rows of opposing internal sides of the shelf assemblies 2 and 3, the cargo carrier 1 is supported on a pair of guide rails 4, 5, disposed parallel to each other. The guide rails also serve as secondary conductors of the linear motors and the rails are secured respectively to the opposing shelf assemblies 2, 3. Thus, the cargo carrier 1 can run between and along the opposing shelves. The cargo carrier 1 is equipped with cargo transferring means, described later in detail, for transferring a load of cargo 7 in the directions indicted by the double arrows in FIG. 1, from or to the cargo storage sections 6 of the shelf assemblies 2, 3.

As shown in FIG. 2, the electrically driven cargo carrier 1 is provided with four pivotably attached supporting wheels 8 which roll on the guide rails 4, 5 and four lateral balancing guide rollers 9 at the front and rear positions of the cargo carriers. These rollers are disposed about both sides of the guide rail 4. The main bodies 10a and 10b of a pair of linear motors are arranged at each side of the cargo carrier parallel to each other between the front and rear supporting wheels 8, each motor body above a respective one of guide rails 4 and 5.

Figure 4:
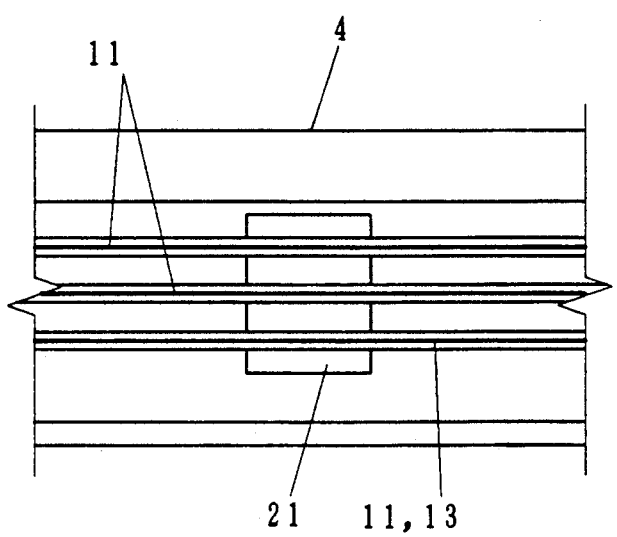
FIG. 4 is a side view of a guide rail with the associated components of the apparatus.

In FIGS. 2-4, a plurality of power supply wires 11 are disposed one over another parallel to each other, are secured to the inside of guide rail 4 facing the center of the running route on the side of the guide rail away from the shelf assembly 2. A plurality of control signal transmission wires 11, but similarly to the power supply wires 13, are disposed one over another, parallel to each other, and are secured to the inside of the other guide rail 5. The electrically driven cargo carrier 1 is provided on both its right and left sides with a pair of front and rear electrical power contacting collectors 15a and 15b, each being slidable over the power supply wires 11, and an electrical control signal collector 16 slidable over the control signal transmission wires 13.

Figure 5:
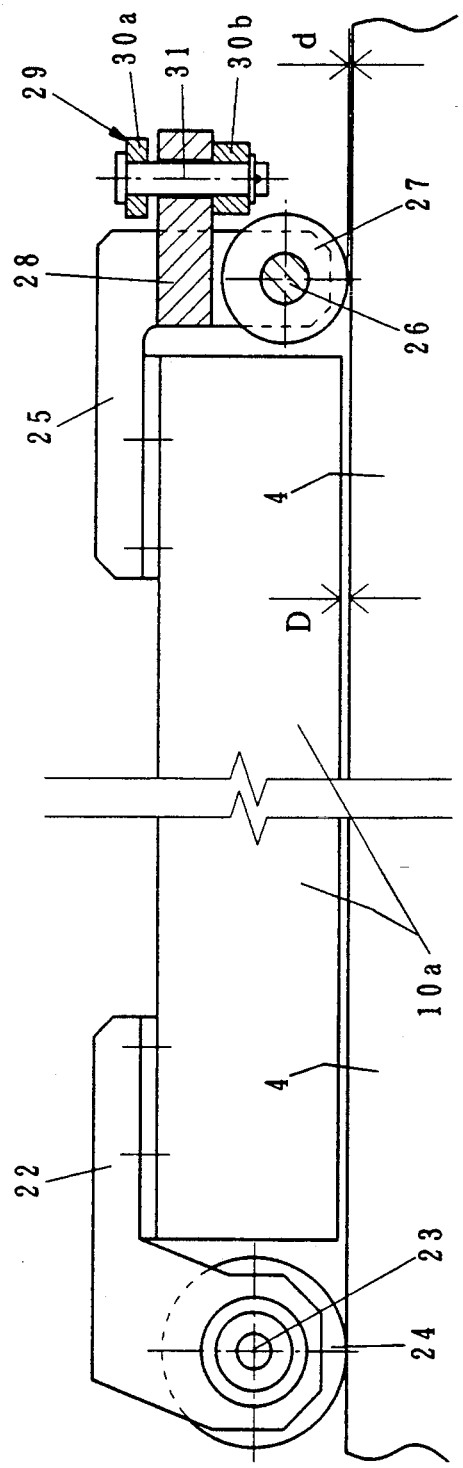
FIG. 5 is a side elevational view, partly in cross section of the structure supporting the main body of a linear drive motor.
Figure 6:
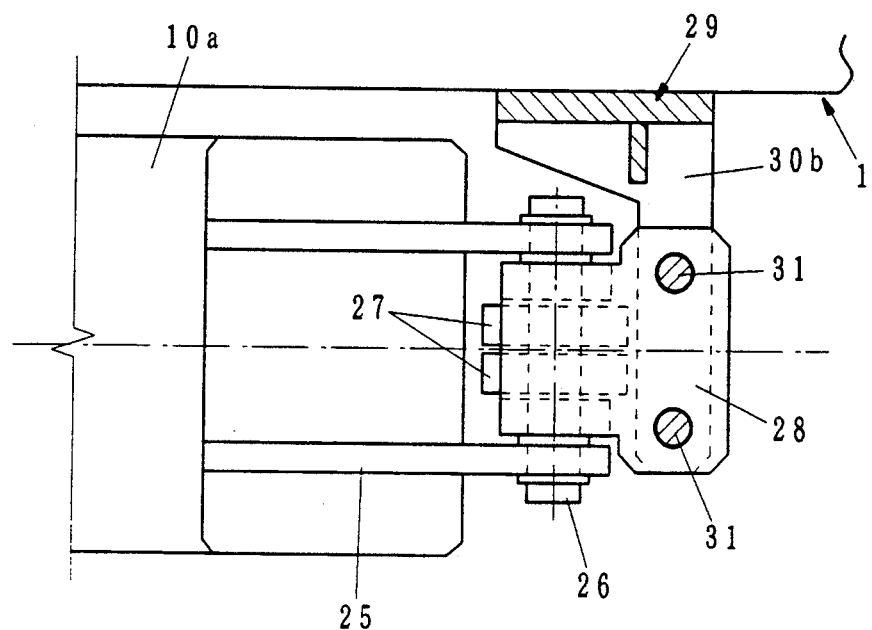
FIG. 6 is an enlarged plan elevational view, partly in cross section, of the components shown in FIG. 5.

In FIG. 3, the guide rails 4 and 5 are respectively secured to the upper surfaces of supporting brackets 19 and 20 which are mounted on the opposing shelf support struts 17 and 18, of two opposing shelf assemblies 2, 3 and adjacent to the running route. The guide rails are positioned to provide a suitable clearance from the shelf support struts 17 and 18. As shown in FIG. 4, a bracket 21 is provided for securing the power supply wires 11 to the internal lateral surface of the guide rail 4. The relationship and structures associated with the control signal transmission wires along the guide rail 5 is similar. As shown in FIGS. 2, 5, and 6, each of the main linear motor bodies 10a and 10b are supported at one end of each main body 10a and 10b with a forward support roller 24 pivoted on a horizontal shaft 23 mounted from a bracket 22 which is fixed on the upper side of one end of each main body 10a. As shown in FIG. 5, the other end of each main body 10a is provided with an auxiliary roller 27 pivoted on a horizontal shaft 26 mounted from a bracket 25 which is fixed on the top of the end of the main body 10a. When viewed from the side a shaped supporting member 28 has one of its ends supported freely on the horizontal shaft 26.

The cargo carrier 1 has supporting brackets 29 each attached to opposed sides of the carrier. Each bracket 29 has an upper side plate part 30a and a lower side plate part 30b separated from one another, and vertical guide rods 31 supported between and bridging the upper and lower side plate parts 30a and 30b. The other end of the L-shaped supporting member 28 is maintained by the guide rods 31 passing through it, up and down movably between the upper and lower side plates 30a and 30b of the supporting bracket 29. The supporting member 28 normally contacts by gravity the lower side plate part 30b. The structures surrounding the main body 10b are the same as described above with reference to the main body 10a.

In this manner, as shown in FIG. 5, the support rollers 24 in the main bodies 10a and 10b of the linear motors ride on the carrier guide rails 4 and 5 serving as the secondary conductors, whereas the auxiliary rollers 27 remain apart from the guide rails 4 and 5 separated from them by a slight gap "d". The main bodies 10a, 10b of the linear motors are opposed to the guide rails 4 and 5 with a requisite gap "D". The gap "D" between the main bodies 10a and 10b of the linear motors and the guide rails 4 and 5, is greater than the gap "d" between the auxiliary rollers 27 and the guide rails 4 and 5.

In the cargo transport system described above, the cargo carrier 1 is driven along the guide rails 4, 5 by electric current supplied to the main bodies 10a, 10b of the linear motors of the cargo carrier 1 at each level of the running routes, through the power supply wires 11 the power collector units 15a, 15b. This induces an electromagnetic coupling between the main bodies 10a, 10b of the linear motors and the guide rails 4, 5 functioning as a secondary conductor to propel the cargo carrier 1 in a predetermined direction. Electric current can also be conducted by the power supply wires 11 and the collector units 15a, 15b to the cargo transfer means.

Control of the cargo carrier 1 and the cargo transferring means is performed with the control signal transmitted between a control unit outside the carrier and a controller (not shown) provided in the cargo carrier, through the control signal transmission wires 13, to start or stop of the cargo carrier and to change the speed of travel, and start or stop the cargo transferring means when required.

As the cargo carrier 1 is driven along the guide rails, the main bodies 10a and 10b of the linear motors are normally maintained with the requisite gap "D" between them and the guide rails 4 and 5 of the secondary conductor. As the supporting wheels 8 of the cargo carrier 1 wear off and thus become reduced in diameter, the actual height of the load carrier 1 above the guide rails 4, 5 will be lowered until the gap "d" between the auxiliary rollers 27 and the guide rails 4 and 5 disappears. At that point the auxiliary rollers 27 will contact the guide rails 4 and 5 and the L-shaped supporting member 28 is displaced along the guide rod 31 from the lower side plate 30b of the supporting bracket 29 fastened on the load carrier. Thus the end of a main body 10 of the linear motor on the auxiliary roller 27 side sits up over the guide rail so that the gap between the guide rail and the end of the main bodies 10 is reduced from the requisite gap "D" to a resulting gap "D-d". The main bodies 10a, 10b of the linear motors are prevented from contacting the guide rails 4 and 5. The requisite gap "D" is maintained between the guide rails and the other ends of the main bodies 10a and 10b of the linear motors on their end at the supporting rollers 24. Thus, the main bodies 10a, 10b of the linear motors will be slightly inclined in relation to the level of the guide rails, but no substantial change in the operation of the linear motors takes place until the angle of inclination remains small. This takes place as the cargo carrier 1 passes through a junction of the guide rails 4 and 5 in which there are level differences, so that contact can be prevented between a main body 10 of the linear motors and a projecting portion of the junction between the guide rails 4 and 5.

It is required that the support rollers 24 and the auxiliary rollers 27 of the linear motors and provided on opposite ends of the main body of the linear motor to prevent any unexpected contact of any of the main bodies 10a and 10b with guide rails 4 and 5 that serve as secondary conductors. However, the structure of a support mechanism for the main bodies of the linear motors can be simplified to provide a mechanism of relatively low cost. This mechanism provides each main body of a linear motor provided at both of its ends with pivoting parallel links between the main body and the frame of the load carrier for supporting the latter in a manner capable of parallel and up and down motion.

Providing the main bodies of the linear motors with such pivoting parallel links, enables abbreviation of the load transport system of the present invention resulting in a reduction of the space occupied by the main bodies the linear motors and their support mechanism. This, in turn, enables a substantial reduction of the size of the load carrier.

The cargo transfer apparatus mounted on the cargo carrier 1 can be a conventional type, such as the running fork type, vertically moving and extending horizontally in and out for loading and unloading cargo to or from the storage sections 6 of the shelf assemblies 2 and 3. A suitable embodiment of a cargo transfer apparatus is indicated generally at 32 in FIG. 7.

It is mounted on the cargo carrier 1, and comprises a cargo load platform 34 having a pair of rails containing freely rotating rollers 33 which are adapted to support a load 7 that is slidable thereon in the load transferring direction perpendicularly to the direction of the double headed arrow. That moves the load on and off the shelves 2 and 3, perpendicularly to the running direction of the cargo carrier 1 between the shelves 2 and 3, as indicated by the double headed arrow. The load is suitably transferred by a pair of load grasping conveyors 35a and 35b on the front and rear of the cargo carrier 1. Both of these grasping conveyors 35a and 35b are adapted to move from their home position along the cargo load platform 34 on the cargo carrier 1 towards and away from one another and also to move the load in the load transferring direction. The load storage shelves 6 of the shelf assembly 2, 3 are each provided with a pair of rails containing freely rotating rollers 36 adapted to be aligned with the rails containing freely rotating rollers 33 on the sides of the load platform 34, to permit the load to be pushed off the cargo deck onto the shelves.

In operation of the cargo transfer apparatus 32, when removing cargo from a shelf 6 and loading it onto the load platform 34, the pair of load grasping conveyors 35a and 35b move from their home position toward the load on the shelf 6. When the respective ends of the load grasping conveyors 35a, 35b come to face opposite sides of the load 7 stored in a predetermined position on the storage shelf 6, both conveyors 35a, 35b are moved toward one another until they grasp the load 7 from both sides between them. The conveyors 35a, 35b are then withdrawn to their home position while grasping and carrying with them the load 7 first over the free rollers 36 and then over the free rollers 33 until the cargo is positioned on the load platform 34. When a cargo 7 is to be offloaded from the carrier 1 into a cargo storage shelf 6, the aforementioned process is reversed and the load grasping conveyors 35a, 35b unload and move the cargo from the load platform 34 to the storage shelf 6.

Figure 8:
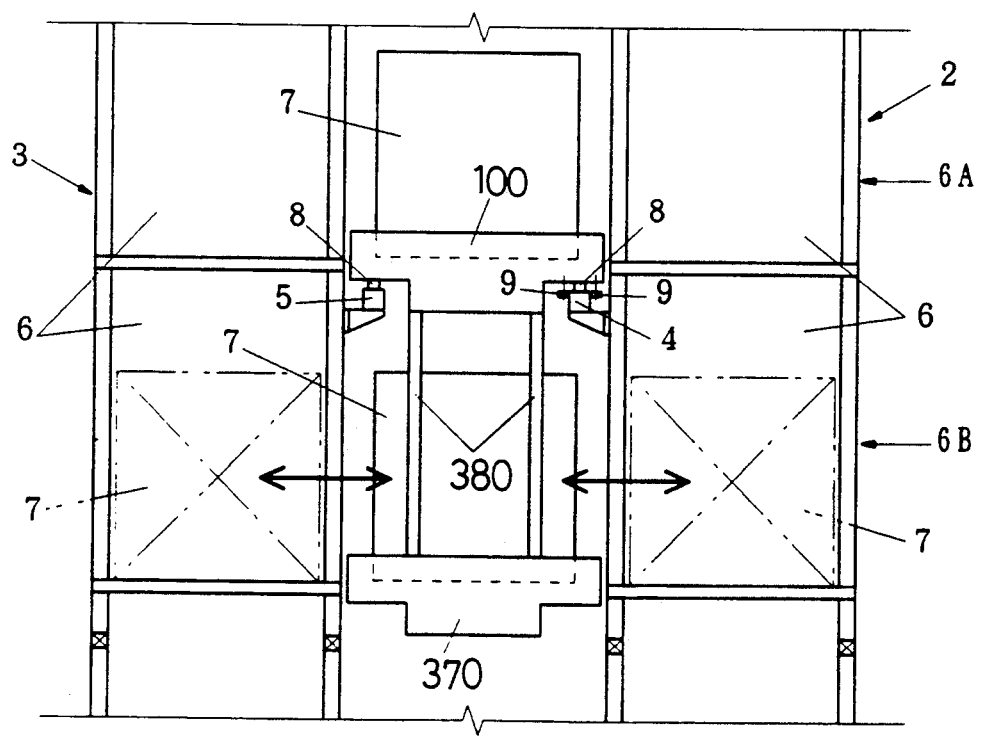
FIG. 8 is a front elevational view of a cargo transport system of another embodiment of the present invention.

In another, a tandem loader embodiment of the invention shown in FIGS. 8 and 9 the cargo carrier 100 is, equipped with a load transfer apparatus 320 built the same way as in the first embodiment. The cargo transferors 320 run along the bottom levels of load storage sections 6A at alternate levels of the opposing shelf assemblies 2, 3. The cargo carrier 100 is movably supported on a pair of guide rails 4 and 5 secured to the corresponding levels. A suspended load transferring device 370, suspended from the cargo carrier 100 by suspender struts 380 adapted to load cargo and unload it from the other alternate storage sections 6B at alternate levels of the opposing shelf assemblies. The suspended load transferring device 37 is equipped with the same kind of load transfer means as the means 32 with load grasping conveyers and sets of free roller rails, as in the load carrier of the first described embodiment.

In operation the second, the tandem loader embodiment of the present invention, the cargo transfer apparatus 320 together with the suspended load transferring device 37 is stopped with the cargo carrier 1 running along the guide rafts 4 and 5, at a position facing storage sections 6A and/or 6B intended to be loaded or unloaded. In the cargo transfer apparatus 320, loading and unloading can suitably be performed at the same time to and from two levels of load storage sections 6A, 6B that are vertically adjacent to one another.

Suitably a regular electric motor can be used as a drive means of the cargo carrier instead of the linear motors to cause, at this time driven wheels 24 to roll on and along the guide rails.

We claim:

1. A cargo transport system for automated warehousing comprising guide rail structures each mounted from an opposing shelving face structure of two rows of storage shelves extending substantially parallel to each other and presenting opposing shelving face structures toward one another, each of said guide rail structures including a guide rail with top surfaces and opposing sides, at least one or more power supply conductors, or control signal conductors, or both power supply conductors and control signal conductors disposed substantially parallel to each other and arranged along the side of at least one guide rail, a cargo carrier adapted to roll over said guide rails and occupy a position thereon, and collector means attached from said cargo carrier for maintaining substantially constant electrically conducting contact with said power supply conductors and said control signals conductors for respectively powering and controlling the movement of said cargo carrier, the cargo carrier having front and rear supporting wheels mounted on each side of the cargo carrier, said supporting wheels being adapted to run on a respective guide rail of each opposing shelving face structure, a main body of a linear motor each mounted from each side of said cargo carrier, a plurality of lateral balancing guide rollers for maintaining said position of the cargo carrier relative to the guide rail, each of the main bodies of said linear motors being arranged on a side of said cargo carrier between respective front and rear supporting wheels close to the top surfaces of the guide rails, said top surfaces of the guide rails serving as secondary conductors for the linear motors, said lateral balancing guide rollers being arranged in pairs and being pivoted from said cargo carrier and being adapted to contact a guide rail on its opposing sides.

2. The cargo transport system of claim 1, wherein a first of said guide rails has said power supply conductors arranged along the side of said first guide rail and second guide rail has said contact signal conductors arranged along the side of said second guide rail.

3. The cargo transport system of claim 1, wherein said cargo carrier comprises an upper cargo platform, rollably supported on said guide rail between upper ones of said two rows of storage shelves, a lower cargo platform suspended from said upper cargo platform, said lower cargo platform being disposed between lower ones of said two rows of storage shelves, said upper cargo platform being adapted to have cargo moved between it and any of said two opposed upper storage shelves, and said lower cargo platform being adapted to have cargo moved between it and any of said two opposed lower cargo shelves.

4. The cargo transport system of claim 2, wherein said cargo carrier comprises an upper cargo platform, rollably supported on said guide rail between upper ones of said two rows of storage shelves, a lower cargo platform suspended from said upper cargo platform, said lower cargo platform being disposed between lower ones of said two rows of storage shelves, side upper cargo platform being adapted to have cargo moved between it and any of said two opposed upper storage shelves, and said lower cargo platform being adapted to have cargo moved between it and any of said two opposed lower cargo shelves.

5. The cargo transport system of claim 1, further comprising means for moving cargo between the cargo carrier and an adjacent shelf.

6. The cargo transport system of claim 2, further comprising means for moving cargo between the cargo carrier and an adjacent shelf.

7. The cargo transport system of claim 3, further comprising means for moving cargo between the cargo carrier and an adjacent shelf.

8. The cargo transport system of claim 4, further comprising means for moving cargo between the cargo carrier and an adjacent shelf.

9. The cargo transport system of claim 1, wherein the linear motor main bodies are supported from said cargo carrier for relative vertical movement between the carrier and the main body, the transport system further comprising a support roller for preventing contact between the main body and the top surface of an adjacent guide rail.

* * * * *